| United States Patent [19] | [11] | 4,082,836 |
|---|---|---|
| Ore | [45] | Apr. 4, 1978 |

[54] PROCESS FOR THE PURIFICATION OF PHOSPHORIC ACID BY EXTRACTION

[75] Inventor: Fernando Ore, Whittier, Calif.

[73] Assignee: Occidental Petroleum Corporation, Los Angeles, Calif.

[21] Appl. No.: 676,522

[22] Filed: Apr. 13, 1976

Related U.S. Application Data

[63] Continuation-in-part of Ser. No. 592,460, Jul. 2, 1975, abandoned.

[51] Int. Cl.$^2$ ............................................. C01B 25/16
[52] U.S. Cl. .................................................. 423/321 S
[58] Field of Search ..................... 423/320, 319, 321 S

[56] References Cited

U.S. PATENT DOCUMENTS

| 3,367,749 | 2/1968 | Koerner | 423/321 S |
| 3,458,282 | 7/1969 | Koerner | 423/321 S |
| 3,497,330 | 2/1970 | Baniel et al. | 423/321 S |
| 3,694,153 | 9/1972 | Williams et al. | 423/321 S |

OTHER PUBLICATIONS

Ion Exchange & Metal Extraction of Metal Complexes — Marcus et al., 1970–pp. 552 to 557.

*Primary Examiner*—O. R. Vertiz
*Assistant Examiner*—Eugene T. Wheelock
*Attorney, Agent, or Firm*—William G. Lane; Edward A. Grannen, Jr.; Barry A. Bisson

[57] ABSTRACT

A process for the extraction of metallic impurities from an unpurified aqueous phosphoric acid phase by solvent extraction employing an organic extractant phase containing an organic sulfonic acid in its H$^+$ form. After the extraction step and separation of the organic extractant phase from the aqueous phosphoric acid phase, residual P$_2$O$_5$ values are recovered from the organic extractant phase by washing the organic extractant phase with a wash phase consisting of water or dilute phosphoric acid. The sulfonic acid in the organic extractant phase can be regenerated to its H$^+$ form with a mineral acid and recycled.

19 Claims, 3 Drawing Figures

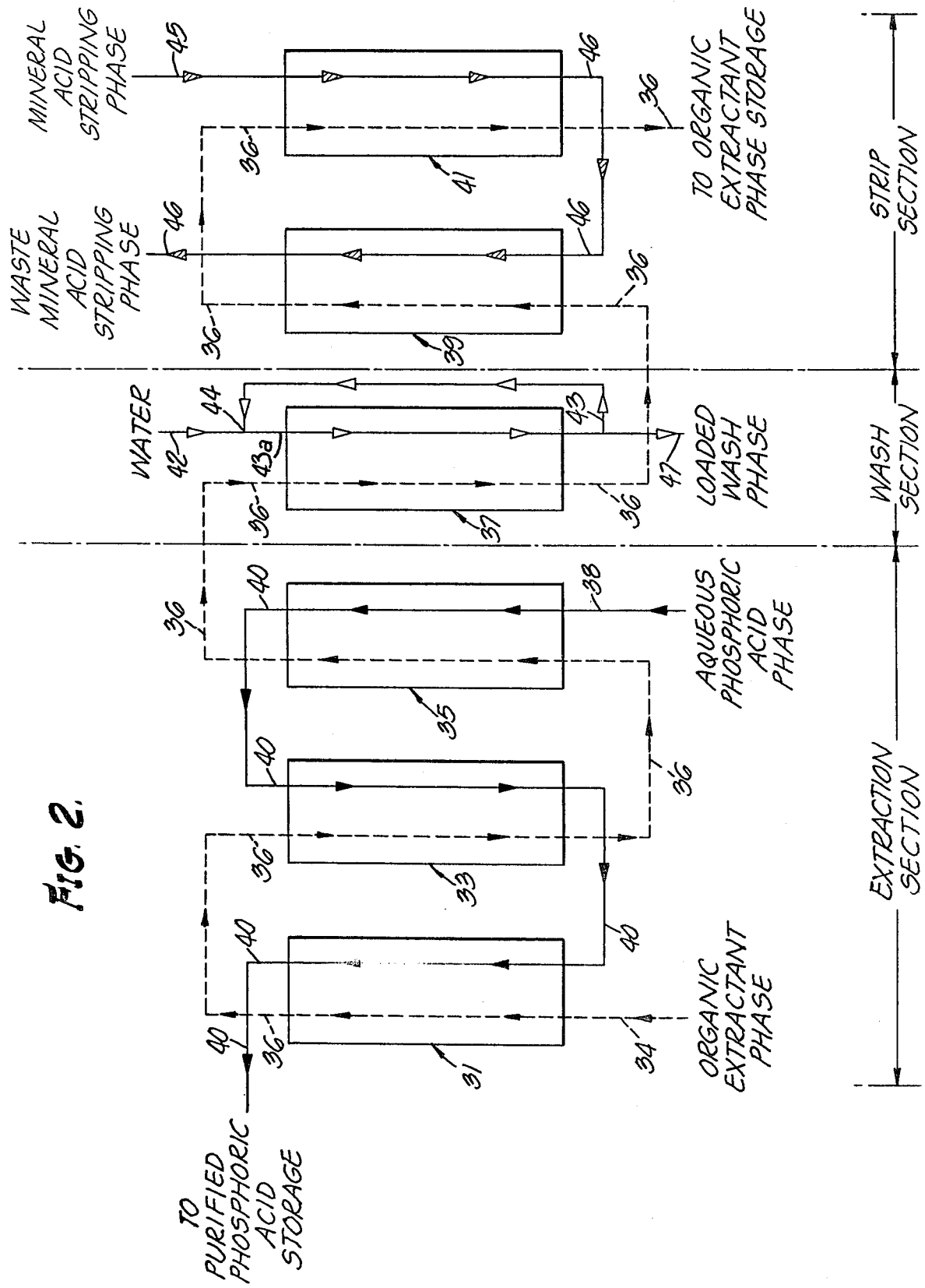

PROCESS FOR THE PURIFICATION OF PHOSPHORIC ACID BY EXTRACTION

BACKGROUND OF THE INVENTION

This application is a continuation-in-part of my application Ser. No. 592,460 filed July 2, 1975 now abandoned, incorporated herein by reference.

Superphosphoric acid (SPA) is a condensation product of orthophosphoric acid. The minimum $P_2O_5$ content of SPA is about 65% by weight, the maximum is greater than 100%. The $P_2O_5$ content of most commercial grades of SPA is from 72% to about 85%.

Wet process phosphoric acid can be converted to SPA by means of conventional evaporation and dehydration techniques. SPA formed from unpurified wet process phosphoric acid is usually unstable due to ionic metallic impurities present therein. The impurities cause an increase in the viscosity of the SPA to such an extent that a semi-solid or glass-like material results. Further processing of such materials is extremely difficult.

On the other hand, purified wet process phosphoric acid yields a low viscosity SPA which can be readily handled.

SPA is in great demand today as an ingredient in the preparation of fertilizers. Some of the advantages of using SPA vs 54% $P_2O_5$ acid are:
1. Higher grades of liquid fertilizer can be prepared.
2. Higher analysis superphosphates and ammonium phosphates can be prepared.
3. Polyphosphates present in SPA sequester impurities and prevents their precipitation in the SPA.
4. SPA can carry larger amounts of micronutrients due to sequestering ability.
5. SPA shipment is more economical due to higher $P_2O_5$ content per pound of material shipped.
6. Polyphosphate slowly hydrolyzes to orthophosphates, accordingly, SPA can be used as slow release fertilizer.

In an effort to produce a wet process phosphoric acid suitable for conversion to SPA, Williams et al, U.S. Pat. No. 3,694,153 devised a means of removing ionic metallic impurities from the phosphoric acid employing water immiscible organic sulfonic acids. Using solvent extraction techniques, wet process phosphoric acid was purified by removing the ionic metallic impurities therefrom. While removing the impurities, $P_2O_5$ values are coextracted with the metallic impurities into the organic phase. These $P_2O_5$ values are usually lost when the water immiscible organic sulfonic acid is regenerated with a mineral acid because the mineral acid regeneration solution containing the ionic metallic impurities and the $P_2O_5$ values is sent to waste disposal; recovery of the $P_2O_5$ values being uneconomical. The cost of the lime required to neutralize the sulfuric acid is greater than the value of the $P_2O_5$ in the waste stream. Depending upon the conditions under which the solvent extraction plant is operated, losses of $P_2O_5$ coextracted into the organic phase can range from about 3% to about 20% or more.

Aqueous phosphoric acid phase denotes a solution of phosphoric acid containing from about 1% to about 55% $P_2O_5$ by weight which will be, is being or has been subjected to solvent extraction. Terms such as phosphoric acid phase, crude phosphoric acid feed, unpurified phosphoric acid solution and purified phosphoric acid can be used to indicate an aqueous phosphoric acid phase.

Organic extractant phase denotes a solution in which at least one organic sulfonic acid is dissolved in an organic solvent and preferably containing a water immiscible aliphatic alcohol. Extractant phase, organic phase, barren organic phase, loaded organic extractant phase, and regenerated organic extractant phase have been used to denote the organic extractant phase at some step in the solvent extraction process.

Wash phase denotes the aqueous phase (water or a dilute solution of phosphoric acid containing from about 10 grams/liter to about 300 grams/liter of $P_2O_5$; about 14% to about 25% $P_2O_5$ by weight) which is used to remove $P_2O_5$ values from the organic extractant phase; said $P_2O_5$ values being coextracted with metal impurities into the organic extractant phase during the extraction step of solvent extraction process. Terms used in denote the wash phase are dilute aqueous phosphoric acid, dilute phosphoric acid, dilute phosphoric acid phase, dilute phosphoric acid stripping phase, water wash phase, loaded wash phase, water wash liquor enriched phosphoric acid solution and enriched phosphoric acid phase.

The mineral acid stripping phase is the solution of an inorganic acid such as sulfuric acid, nitric acid or hydrochloric acid which is used to regenerate the organic sulfonic acid(s) present in the organic extractant phase. Sulfuric acid stripping solution, sulfuric acid stripping phase, fresh sulfuric acid stripping solution, stripping agent, sulfuric acid phase, waste sulfuric acid stripping, waste sulfuric acid stripping solution, waste solution and waste stripping agent are used to denote the mineral acid stripping phase.

A mineral acid is an inorganic acid having an ionization constant equal to $10^{-3}$ or greater.

SUMMARY OF THE INVENTION

The present invention is directed to a process for purifying phosphoric acid using solvent extraction techniques. An unpurified aqueous phosphoric acid phase containing from 1% to 55% $P_2O_5$ by weight and dissolved ionic metallic impurities such as calcium, magnesium, iron (II & III) and aluminum is thoroughly mixed with an organic extractant phase containing at least one organic sulfonic acid in the $H^+$ form. As a result of the thorough mixing, an organic extractant phase containing at least one organic sulfonic acid, extracted ionic metallic impurities and extracted $P_2O_5$ values is formed and separated from the purified aqueous phosphoric acid phase. The organic extractant phase is contacted with a wash phase (water or dilute phosphoric acid containing from about 10 grams/liter to about 300 grams/liter of $P_2O_5$) to form a loaded wash phase enriched with $P_2O_5$ values extracted from the organic extractant phase. The loaded wash phase is separated from the organic extractant phase. The organic extractant phase can be regenerated on treatment with a mineral acid and recycled into the process.

THE DRAWINGS

FIG. 2 is a schematic of the present solvent extraction process; and

DETAILED DESCRIPTION

Figure 1:
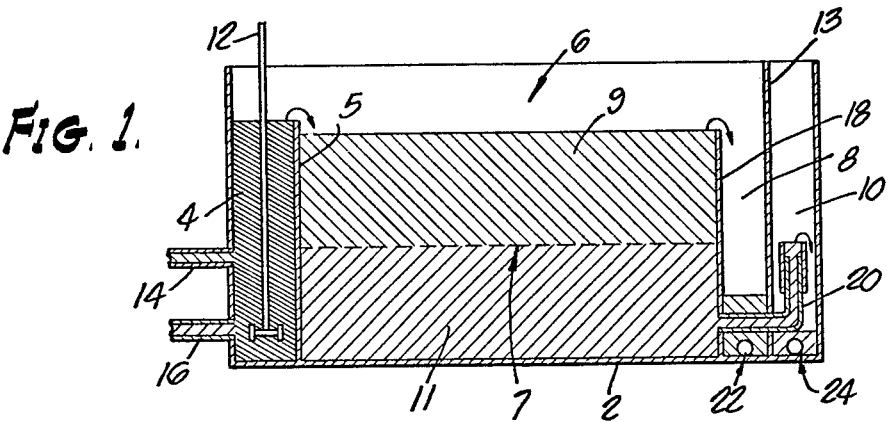
FIG. 1 is a side view of a mixer-settler cell employed in the present solvent extraction process.

The present process is directed to the purification of phosphoric acid by means of solvent extraction. The process is comprised of an extraction step, a wash phase stripping step and a mineral acid stripping step.

The extraction step comprises mixing an aqueous phosphoric acid phase with an organic extractant phase. The aqueous phosphoric acid phase, containing from 1% to 55% $P_2O_5$ by weight and ionic metallic impurities such as $Ca^{+2}$, $Mg^{+2}$, $Al^{+3}$, and $Fe^{+2,+3}$, is thoroughly mixed with an organic extractant phase (also referred to as the barren organic phase) which contains at least one water immiscible organic sulfonic acid in its $H^+$ form. Ionic metallic impurities are extracted from the aqueous phosphoric acid phase into the organic extractant phase. After mixing, the purified aqueous phosphoric acid phase separates from the organic extractant phase which now contains ionic metallic impurities and some $P_2O_5$ values extracted from the aqueous phosphoric acid phase. Separation occurs in a mixer-settler cell due to density differences and the immiscibility of the two phases. Separation is effected by pumping, decanting gravity flow or the like.

The separated organic extractant phase containing the ionic metallic impurities and $P_2O_5$ values is mixed with a wash phase which can be water and more preferably a dilute phosphoric acid phase containing from about 10 grams/liter to about 300 grams/liter of $P_2O_5$. The wash phase extracts the $P_2O_5$ values over the ionic metallic impurities from the organic extractant phase. The wash phase enriched with $P_2O_5$ values extracted from the organic extractant phase is separated from the organic extractant phase. Separation occurs due to density differences and the mutual immiscibility of the phases in a mixer-settler cell.

The separated wash phase can be used as a source of purified phosphoric acid, or it can be mixed with the aqueous phosphoric acid phase which is the feed for the extraction step or it can be diluted with water to form the wash phase, that is the dilute phosphoric acid phase, used to recover $P_2O_5$ values from the organic extractant phase.

The organic extractant phase after separation from the dilute phosphoric acid phase can be treated with a mineral acid stripping phase preferably containing sulfuric, nitric or hydrochloric acid, to regenerate the sulfonic acid extractant to its $H^+$ form. Separation of the organic extractant phase from the mineral acid stripping phase in a mixer-settler cell results from differences in density and mutual immiscibility of the two phases. Separation is effected by pumping, decanting, gravity flow or the like. Thereafter the regenerated organic extractant phase can be recycled into the extraction step described above.

The present process is run at a temperature of from about 50° to about 65° C to reduce $P_2O_5$ loss to the organic extractant phase and to increase the speed of separation of the organic phases from the aqueous phases.

The aqueous phosphoric acid phase can be wet process phosphoric acid produced by the dihydrate, the hemihydrate or the anhydrite process; it may be a dilute (1.0% to 5% $P_2O_5$ by weight) solution produced by the acidulation of $P_2O_5$ values in slimes produced in the benefication of phosphate rock, or it may be a waste stream or phosphoric acid which can contain, in addition to the impurities mentioned, also nickel, copper, zinc, chromium and the like. Phosphoric acid is produced by a wet process method and contains from about 5% to about 55% $P_2O_5$ by weight.

The temperature of the aqueous phosphoric acid phase entering the solvent extraction system is from about 20° C to about 77° C, preferably from 55° C to about 70° C.

The organic extractant phase consists of one or more water immiscible organic sulfonic acids. Preferably the water immiscible organic sulfonic acids are dissolved in a water immiscible organic solvent.

Water immiscible organic sulfonic acids employed in accordance with the practice of this invention includes aryl-, alkylaryl-, polyalkylaryl-, alkanoylaryl-, and polyalkanoylaryl-sulfonic acids.

An especially preferred group of sulfonic acids for the present invention are the substituted sulfonic acids of formulas I and II

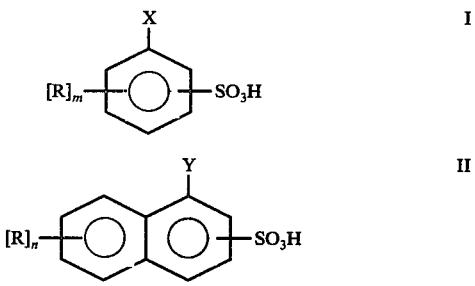

wherein in formula I, R is an alkyl group of from 5 to 25 carbon atoms or an alkanoyl group of 8 to 18 carbons, $[R]_m$ contains at least 8 carbon atoms when $m$ is 1 and $[R]_m$ contains at least 10 carbon atoms when $m$ is 2 and further provided that $m$ can be 1 or 2 when R is alkyl and $m$ can be 1 when R is alkanoyl; wherein in Formula II, R is an alkyl group of from 5 to 25 carbon atoms or an alkanoyl group of from 5 to 18 carbon atoms. $[R]_n$ contains at least 8 carbon atoms when $n$ is 1, $[R]_n$ contains at least 10 carbon atoms when $n$ is 2 and $[R]_n$ contains at least 15 carbon atoms $n$ is 3, further provided that $n$ can be 1, 2, or 3 when R is alkyl and $n$ can be 1 or 2 when R is alkanoyl; X is hydrogen, hydroxy, fluoro, chloro, bromo, iodo, methoxy, ethoxy, propoxy, -carboxymethoxy or -carboxyethoxy; and Y is hydrogen, hydroxy, fluoro, chloro, bromo, iodo, methoxy, ethoxy, 2-propoxy, -carboxymethoxy, or -carboxyethoxy; provided, however, that Y is in the alpha position with respect to the —$SO_3H$ group and further provided that the —$SO_3H$ group is at position 1 or 2 on the naphthalene molecule.

The R alkyl or alkanoyl groups can be in any position on the benzene or naphthalene rings and can be on one or both of the naphthalene rings. The R alkyl groups can be straight chain or branched chain groups, preferably branch chained groups.

These compounds are made by known chemical processes, for example; the Friedel-Crafts reaction is used to alkylate the phenol or naphthalene and the Williamson type ether synthesis is used when an ether linkage is introduced into the molecule.

The water immiscible organic sulfonic acids contain at least 12 carbon atoms and preferably about 14 to about 30. An especially preferred group of water immiscible organic sulfonic acids for the present process include dinonylnaphthalene sulfonic acid, 5-dodecanoyl-2-chlorobenzenesulfonic acid, 5-nonyl-2-ethoxybenzenesulfonic acid, 3,5-di-ti-octyl-2(alphacarboxymethoxy) -benzenesulfonic acid and 3,5-di-t-octyl-2-hydroxybenzenesulfonic acid.

The water immiscible organic sulfonic acid can be dissolved in the water immiscible organic solvent in concentrations of about 0.05 molar to about 3.0 molar of the water immiscible organic sulfonic acid. The preferred concentration range of the sulfonic acid in the organic solvent is from about 0.2 molar to about 0.5 molar.

The preferred solvents are saturated hydrocarbons having a boiling point between 120° C and 230° C, flash points between 15° C and 70° C and densities lower than the density of the phosphoric acid.

Illustrative, but nowise limiting, of the water immiscible organic solvents for the organic sulfonic acids employed in the present process are kerosene, mineral spirits, benzene, alkyl-substituted aromatic compounds and alkyl-substituted haloaromatic compounds, such as xylene, toluene, ethylbenzene, chlorotoluene and the like, nitrobenzene, carbon tetrachloride, chloroform, methylene chloride, trichloroethylene, isooctane, heptane and the like. As is well known, materials such as kerosene and mineral spirits are mixtures of compounds.

When using solvent extraction techniques to effect transfer of solutes from one phase to another phase, there can be a problem with emulsion formation. This problem can be minimized by employing water immiscible aliphatic alcohols.

Water immiscible aliphatic alcohols are usually added to the oganic phase and in addition to aiding in the separation of the organic phase from the aqueous phase, they tend to increase the solubility of the water immiscible organic sulfonic acid in the organic phase. Water immiscible aliphatic alcohols are preferred, straight chain or branched chain aliphatic alcohols being especially preferred. Water immiscible aliphatic alcohols which can be employed in the present process are octonol, decanol and isodecanol. Isodecanol is especially preferred.

For the present process, it has been found that the water immiscible aliphatic alcohol can be used in concentrations from 5% to about 20% by weight, based on the weight of the organic extractant phase. A concentration of 7% to about 12% by weight, based on the organic extractant phase, is preferred.

The organic extractant phase enters the solvent extraction system at a temperature of about 20° C to about 60° C, preferably from about 50° C to about 58° C.

The phosphoric acid phase at a temperature of from 20° to 77° C is mixed with the organic extractant phase at a temperature of about 20° to about 60° C; the temperature of the resulting mixture is from about 20° to about 65° C.

The volume ratio of the organic extractant phase to the aqueous phosphoric acid phase in the present process is from about 1 to 1 to about 100 to 1, preferably from about 2 to 1 to about 12 to 1. An especially preferred volume ratio is from about 3 to 1 to about 8 to 1 of the organic extractant phase to the aqueous phosphoric acid phase.

The organic extractant phase is vigorously mixed with the aqueous phosphoric acid phase at least once during the purification process. However, the organic extractant phase can be contacted with the aqueous phase a number of times during the process. The number of separate contacts can be from 1 to about 20 or more; preferably at least 3 contacts are utilized in the present invention.

The organic extractant phase contacts the aqueous phosphoric acid phase and is separated therefrom. Separation in a mixer-settler cell results from differences in densities and the mutual immiscibility of the phases.

The organic extractant phase extracts $P_2O_5$ values as well as ionic metallic impurities from the aqueous phosphoric acid phase. The $P_2O_5$ values can range from 3% to about 20% of the $P_2O_5$ initially present in the aqueous phosphoric acid phase. Recovery of these $P_2O_5$ values from the organic extractant phase is desirable.

In the present process it has been found that a wash phase, water or a dilute phosphoric acid phase can remove the $P_2O_5$ values over the ionic metallic impurities from the organic extractant phase.

The organic extractant phase, containing the ionic metallic impurities and $P_2O_5$ values extracted from the aqueous phosphoric acid phase, is vigorously mixed with a wash phase. Jet mixers, line mixers, centrifugal pumps, mechanical agitators and the like can be used to effect the mixing. Separation in a mixer-settler cell results from differences in densities and the mutual immiscibility of the two phases. Separation is effected by pumping, decanting, gravity flow or the like. Separation of the two phases gives an organic extractant phase and a loaded wash phase. The loaded wash phase has removed $P_2O_5$ values from the organic phase. The temperature maintained in the wash phase is from about 20° C to about 70° C, preferably from about 55° C to about 65° C.

The volume ratios of the organic extractant phase to the wash phase are from 1 to 1 to about 100 to 1, preferably from about 2 to 1 to about 10 to 1. The water utilized, either alone or as a diluent for phosphoric acid can be process water, distilled or deionized water, tap water or hot steam condensate water. Hot steam condensate water at a temperature of about 70° C is preferred because it maintains the wash phase at a temperature of about 55° C to about 65° C. The concentration of the phosphoric acid after dilution with water is from about 10 grams/liter (about 1% $P_2O_5$ by weight) to about 300 grams/liter (about 25% $P_2O_5$ by weight), preferably from 150 grams/liter (about 14% $P_2O_5$ by weight) to about 200 grams/liter (about 25% $P_2O_5$ by weight).

After thorough mixing of the wash phase with the organic extractant phse at a temperature of from about 20° to about 65° C, the wash phase and the organic extractant phase are separated. Separation occurs in a mixer-settler cell due to differences in density and the immiscibility of the phases. The phases are separated by pumping, decanting, gravity flow or the like. The separated wash phase, now termed the loaded wash phase, preferably containing from 250 grams/liter to 350 grams/liter $P_2O_5$ (21% to 27% $P_2O_5$ by weight), can be diluted with water to prepare additional wash phase, or it can be added to the aqueous phosphoric acid phase to be returned to the extraction step of it can be used as a source of purified phosphoric acid or the like.

If water is used alone as the wash phase, emulsions can form which are difficult to treat. The use of additives or the use of physical means to break the emulsions is possible but not desirable. Secondly, if only water were used and the resulting loaded wash phase was added to the aqueous phosphoric acid phase, the dilution of the aqueous phosphoric acid phase would be intolerable. In effect, the phosphoric acid would be diluted making it more difficult to ultimately recovery SPA.

The organic extractant phase separated from the loaded wash phase can be regenerated by treatment with a mineral acid phase. Ionic metallic impurities and residual $P_2O_5$ values are removed from the organic extractant phase by means of a mineral acid stripping treatment and the water immiscible organic sulfonic acid is regenerated to its $H^+$ form.

The mixing of the mineral acid stripping phase and the organic extractant phase is achieved with a jet mixer, line mixer, centrifugal mixer, a mechanical agitator or the like. The temperature of the mixture is from about 20° to about 65° C. Separation of the two phases occurs in a mixer-settler cell due to immiscibility of the two phases and a difference in specific gravities. The phases are further separated by pumping, decanting, gravity flow or the like.

The volume ratios of the organic extractant phase to the mineral acid stripping phase is from 1 to 1 to about 20 or more to 1, preferably 2 to 1 to about 10 to 1. The organic extractant phase is contacted with the mineral acid stripping phase at least once, preferably from 1 to about 10 times and most preferably at least 2 times.

The mineral acid used in stripping the organic extractant phase can be sulfuric, nitric, or hydrochloric acid; sulfuric acid being preferred. The concentration of the hydrochloric acid and the nitric acid is from about 2% acid to about 20% acid by weight. The concentration of the sulfuric acid in the mineral acid stripping phase is from about 2% to about 30.0% $H_2SO_4$ by weight, preferably from 15% to 25% $H_2SO_4$ by weight. The mineral acid stripping phase is maintained at about 20° C to about 77° C, preferably from 60° C to 71° C. The temperature of the mineral acid stripping phase is achieved by utilizing the heat of dilution of the mineral acid with water and by using hot steam condensate as the diluent for the mineral acid.

The hot mineral acid stripping phase (hereinafter the mineral acid is sulfuric acid) removes the extracted ionic metallic impurities and the residual $P_2O_5$ values from the organic extractant phase. The mineral acid stripping phase after separation (as described) from the regenerated organic extractant phase contains unused sulfuric acid, phosphoric acid and the sulfate salts of the ionic metallic impurities. When the initial concentration of the sulfuric acid in the mineral acid stripping phase is from 10% to 30% $H_2SO_4$ by weight, considerable amounts of sulfuric acid are present in the waste mineral acid stripping phase which can be utilized by mixing it with fresh mineral acid stripping phase. Alternately, all or a portion of waste mineral acid stripping phase can be sent to waste disposal where the sulfuric acid in the mineral acid stripping phase is reacted with lime or the like to form gypsum. At least a stoichiometric amount of sulfuric acid is used to regenerate the organic sulfonic acid in the organic extractant phase. The regenerated organic extractant phase, having the water immiscible organic sulfonic acid contained therein converted back to its $H^+$ form, is transported to the organic extractant phase storage area (barren organic phase) for use in the above extraction process.

FIG. 1 illustrates a mixer-settler typical of those used in the present process. The mixer-settler 2 is a rectangular container, the length being greater than the width or depth. The top portion is open, although during operation it can be covered to reduce solvent loss, decrease fire hazard and reduce the introduction of contamination therein. The mixer-settler 2 is divided into several sections. A mixing chamber 4, containing an agitator 12 and an organic extractant phase inlet 14 and an aqueous phosphoric acid phase inlet 16 are located at one end of the mixer-settler 2. The inlets 14 and 16, are located in the bottom portion of the mixing chamber 4 in order to achieve good contact between the organic and aqueous phases. The organic extractant phase — aqueous phase mixture passes over a weir 5 when mixing chamber 4 is filled into a settling chamber 6. Here the phases separate into an organic extractant phase 9 and an aqueous phosphoric acid phase 11, interface 7 forming between the two phases 9 and 11. At times, a small emulsion band, several inches thick can occur at the interface 7. Recovery chambers 8 and 10 are separated by a wall 13. When the settling chamber becomes filled, the organic extractant phase 9 passes over a weir 18 into an organic extractant phase recovery chamber 8. At the same time, the aqueous phase 11 passes through an adjustable standpipe 20 which controls the position of the interface 7 into the aqueous phase recovery chamber 10. Once in the recovery chamber 8, the organic extractant phase passes through an outlet 22 and is sent either to storage (not shown) or to another mixer-settler cell (not shown) for further treatment. Aqueous phosphoric acid phase passes through outlet 24 and is sent to storage as purified phosphoric acid or to another mixer-settler cell (not shown).

In a continuous process, several mixer-settler cells can be arranged in series with the organic extractant phase moving through the cells in series counter-currently to the movement of the aqueous phosphoric acid phase through the cells.

Figure 3:
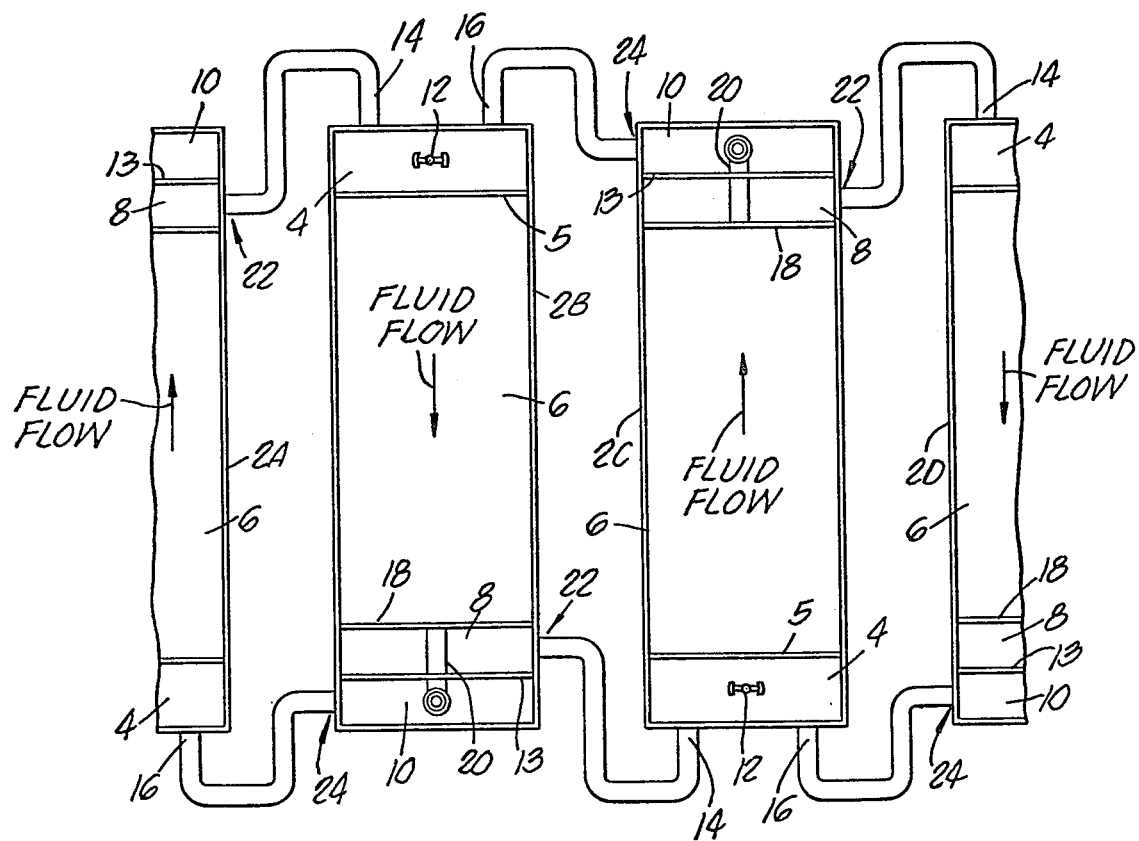
FIG. 3 is a plan view showing the fluid flow pattern through a series of mixer-settler cells as employed in the present solvent extraction process.

FIG. 3 (a plan view) shows in detail the operation of mixer-settler cells illustrated in FIG. 1. The cells are arranged so that the mixing section of one cell is adjacent to the separation section of the adjacent cell.

With respect to the operation of mixer-settler cell 2C, the aqueous phosphoric acid phase from cell 2D enters mixing chamber 4 at inlet 16. Simultaneously, organic extractant phase from cell 2B enters mixing chamber 4 at inlet 14. The two phases are thoroughly mixed by means of agitator 12. As soon as the combined volumes of the aqueous phosphoric acid phase and the organic extractant phase fills the mixing chamber 4, the liquid flows over weir 5 into settling chamber 6. In chamber 6 the aqueous phosphoric acid phase separates from the organic extractant phase. Since the aqueous phosphoric acid phase has a higher specific gravity it will settle to the bottom of chamber 6; the organic extractant phase will float above the aqueous phosphoric acid phase.

The settling chamber 6 is soon filled and the organic extractant phase begins to overflow weir 18 into the organic phase recovery chamber 8. The time of the overflow of the aqueous phosphoric acid phase into the aqueous phase recovery chamber 10 via standpipe 20 will depend upon the height of the adjustable standpipe 20. When the adjustable standpipe 20 is shortened, aqueous phosphoric acid phase flow into recovery chamber 10 occurs before the organic extractant phase overflows weir 18. If the adjustable standpipe 20 is extended, aqueous phosphoric acid phase can begin filling recovery chamber 10 after the organic extractant phase has begun to overflow weir 18.

The aqueous phosphoric acid phase leaves cell 2C through outlet 24 and enters cell 2B through inlet 16 into mixing chamber 4. The organic extractant phase leaves cell 2C through outlet 22 and enters cell 2D through inlet 14 into mixing chamber 4. The procedure described above for cell 2C is repeated in cells 2A, 2B and 2D.

FIG. 2 is a schematic of the presently preferred process for the purification of phosphoric acid. Aqueous phosphoric acid phase 38 prepared by the dihydrate, the hemihydrate or the anhydrite process enters mixer-settler cell 35, similar to the cell 2 in structure illustrated in FIG. 1. The incoming aqueous phosphoric acid phase 38, at a temperature of about 20° C to about 77° C, is mixed with an organic extractant phase 36, at a temperature of about 20° to about 60° C, which contains considerable quantities of ionic metallic impurities and $P_2O_5$ values as the result of having passed through mixer-settler cells 31 and 33, which are similar to the cell 2 illustrated in FIG. 1. The temperature of the mixture is about 50° to about 65° C. The organic extractant phase 36 and the aqueous phosphoric acid phase 38 so mixed passes into the settling chamber 6 (not shown, but shown in FIG. 1) of mixer-settler cell 35 in which the two phases separate. The aqueous phosphoric acid phase 40 passes into mixer-settler cell 33, where the mixing, settling and separation steps described above are repeated. The organic extractant phase 36 contacting the aqueous phosphoric acid phase 40 in mixer-settler cell 33 contains less extracted ionic metallic impurities than the organic extractant phase entering cell 35 because it has contacted the aqueous phosphoric acid phase in only one cell.

On exiting cell 33, the aqueous phosphoric acid phase 40 is sent to mixer-settler cell 31, and is mixed with organic extractant phase 34 entering cell 31. The organic extractant phase 34 enters the extraction section at a temperature of about 20° C to about 60° C, preferably from about 50° C to about 58° C. The temperature of the resulting mixture is about 50° C to about 65° C.

The mixing, settling and separation process is repeated in cell 31. The aqueous phosphoric acid phase 40 exiting cell 31 is purified to such an extent that it is suitable for SPA production and passes to purified phosphoric acid storage (not shown).

The organic extractant phase 36 extracts ionic metallic impurities from aqueous phosphoric acid phase 40 in cells 31, 33, and 35; in addition, $P_2O_5$ values are coextracted into the organic extractant phase 36. The organic extractant phase 36 containing ionic metallic impurities and $P_2O_5$ values after leaving the extraction section enters mixer-settler cell 37 of the wash section. Cell 37 is similar in structure to the cell illustrated in FIG. 1.

Water is mixed with a solution of phosphoric acid either in the mixing chamber 4 as shown in FIG. 1 or in a T-junction 44 as shown in FIG. 2.

In the preferred embodiment, wash phase 42 is mixed with phosphoric acid at T-junction 44. The resulting dilute phosphoric wash phase 43a passes into cell 37. The organic extractant phase 36 is vigorously mixed with the wash phase 43a in cell 37. $P_2O_5$ values are extracted from the organic extractant phase 36 into the wash phase 43a. After settling, the organic and aqueous phases are separated. The loaded wash phase is divided into streams 43 and 47. The loaded wash phase stream 43 is diluted with incoming water 42, at T-junction 44 and recycled back into cell 37. The stream 47 is mixed with aqueous phosphoric acid phase 38 (not shown) and re-enters mixer-settler cell 35 (not shown). The organic extractant phase 36, exiting cell 37, contains ionic metallic impurities and residual $P_2O_5$ values and is treated in mixer-settler cells 39 and 41 with mineral acid stripping phases 45 and 46. Cells 39 and 41 are similar in structure to the cell illustrated in FIG. 1.

In the strip section as in the other sections, the flow of the organic and aqueous phases is counter-current. The organic extractant phase 36 from the wash section is contacted with a mineral acid stripping phase 45 comprised of from about 2% to about 30% by weight sulfuric acid, with the remainder being water. The temperature of the mineral acids stripping phase 45 is from about 20° C to about 77° C, preferably from 60° C to about 71° C. This temperature is achieved by utilizing the heat of dilution of sulfuric acid with water and with hot steam condensate.

The mineral acid stripping phase 45 is pumped into mixer-settler cell 41 and mixed with the partially stripped organic extractant phase 36 coming from mixer-settler cell 39, the temperature of the resulting mixture is from about 50° C to about 65° C. After mixing, the mixture of the organic and the aqueous phase is allowed to settle and separate into discrete phases. The immiscibility of the two phases and the difference in the specific gravities of the phases aids separation. After separation, the organic extractant phase 36 is pumped to organic extractant phase storage (not shown). The mineral acid stripping phase 46 which contains ionic metallic impurities and residual $P_2O_5$ values is pumped to mixer-settler cell 39 where the mineral acid stripping phase 46 is mixed with the organic extractant phase 36 which has just been washed with a wash phase in the cell 37. The mineral acid stripping phase 46 on exiting cell 39 is termed the waste mineral acid stripping phase. The waste mineral acid stripping phase on exiting the mixer-settler cell 39 is reduced in strength to between about 15% to 20% by weight $H_2SO_4$. The waste mineral acid stripping phase can be partially combined with mineral acid stripping phase 45 (not shown) to further utilize unused sulfuric acid values in said waste mineral acid stripping phase, or it can be sent to a disposal area (not shown) where the sulfuric acid values, the $p_{P_2O_5}$ values and the metallic impurities can be precipitated by the addition of lime or the like to waste mineral acid stripping phase 46.

EXAMPLE 1

A stock solution of the organic extractant phase was prepared by dissolving dinonylnaphthalenesulfonic acid (DNSA) in mineral spirits containing isodecanol. The composition by weight was as follows:

| DNSA | 20% |
| --- | --- |
| Mineral Spirits | 70% |
| Isodecanol | 10% |

The organic extractant phase, as described above, was contacted with phosphoric acid containing 41% by weight $P_2O_5$ at a phase volume ratio of 6/1 (organic/phosphoric acid) at 54° C. After the phases separated, the organic extractant phase was centrifuged to remove any entrained phosphoric acid phase therefrom. The ionic metallic impurity content and the $P_2O_5$ content of the organic extractant phase was determined in the following manner. An aliquot of the organic phase was stripped twice with equal volumes of 2N HCl; the total volume of the HCl used was equal to the volume of the organic extractant phase analyzed. The ionic metallic impurities were analyzed by means of atomic absorption spectrophotometric methods. The $P_2O_5$ (% by weight) was analyzed by the official method of AOAC Method 12, page 13, 11th Edition, 1960*.

*AOAC - Association of Official Analytical Chemists, P.O. Box 340, Benjamin Franklin Station, Washington, D.C. 20044.

Stripping of the loaded organic extractant phase is accomplished by contacting the organic extractant phase with variable amounts of a mixture of dilute phosphoric acid (recycled acid) and the material used to strip the organic phase, either water or sulfuric acid (fresh acid). Table 1 lists the test conditions, the nature of the sample and the analytical results. Table 2 lists the percent impurity removed from the organic phase and the material balance for the stripping operation. Table 3 lists the calculated distribution coefficients K(o/A) and the separation factors S.F.

$$\left( \frac{K \text{ (impurity)}}{K \text{ (}P_2O_5\text{)}} \right).$$

The percent of the $P_2O_5$ removed from the organic extractant phase was fairly constant. However, the percentage of the ionic metallic impurities removed from the organic extractant phase when water was used in place of sulfuric acid is very low. The S.F. indicate that the $P_2O_5$ is preferentially separated from the ionic metallic impurities during the stripping of the organic extractant phase with the dilute phosphoric acid stripping phase.

Table 1
ANALYTICAL DATA

| TEST CONDITIONS | SAMPLES | $P_2O_5$, g/l | $Al_2O_3$, g/l | $Fe_2O_3$, g/l | MgO, g/l | CaO, g/l |
|---|---|---|---|---|---|---|
| #1- 2% $H_2SO_4$ 10/1 org to fresh acid 4/1 org to total aqueous 1 minute shake time | a) loaded DNSA (200ml) b) recycled acid (30ml) c) wash product (50ml) d) washed DNSA (200ml) | 10.2 103 102 1.85 | 0.27 0.87 0.18 | 0.10 0.73 0.04 | 0.28 0.24 0.24 0.25 | 0.13 0.08 0.12 |
| #2- 4% $H_2SO_4$ 6/1 org to fresh acid 4/1 org to total aqueous 1 minute shake time | a) loaded DNSA (200ml) b) recycled acid (17ml) c) wash product (50ml) d) washed DNSA (200 ml) | 10.2 60.0 61.8 1.00 | 0.27 0.81 0.15 | 0.10 0.53 0.03 | 0.28 0.47 0.47 0.20 | 0.13 0.17 0.11 |
| #3- 2% $H_2SO_4$ 6/1 org to fresh acid 4/1 org to total acid 2 minute shake time | a) loaded DNSA (200ml) b) recycled acid (17ml) c) wash product (50ml) d) washed DNSA (200ml) | 10.2 62.0 62.8 1.38 | 0.27 0.45 0.20 | 0.10 0.38 0.04 | 0.28 0.18 0.17 0.24 | 0.13 0.06 0.12 |
| #4- 4% $H_2SO_4$ 10/1 org to fresh acid 4/1 org. to total acid 2 minutes shake time | a) loaded DNSA (200ml) b) recycled acid (30ml) c) wash product (50ml) d) washed DNSA (200ml) | 10.2 99.8 99.8 1.45 | 0.27 1.28 0.16 | 0.10 0.93 0.02 | 0.28 0.63 0.62 0.23 | 0.13 0.21 0.12 |
| #5- Water 6/1 org to fresh water 4/1 org to total aqueous 1 minute shake time | a) loaded DNSA (200ml) b) recycled "acid" (17ml) c) wash product (50ml) d) washed DNSA (200ml) | 10.2 60.0 61.8 1.20 | 0.27 0.13 0.24 | 0.10 0.15 0.07 | 0.28 0.02 0.02 0.27 | 0.13 0.01 0.13 |

Table 2

| | TEST CONDITIONS | | Material Balance % WASHED FROM LOADED DNSA | | | | | MATERIAL BALANCE, % | | | | |
|---|---|---|---|---|---|---|---|---|---|---|---|---|
| # | WASH ACID | PHASE RATIO ORG/FRESH ACID | $P_2O_5$ | $Al_2O_3$ | $Fe_2O_3$ | MgO | CaO | $P_2O_5$ | $Al_2O_3$ | $Fe_2O_3$ | MgO | CaO |
| 1 | 2% $H_2SO_4$ | 10/1 | 82 | 33 | 60 | 11 | 8 | +3 | −1 | +6 | −2 | +5 |
| 2 | 4% $H_2SO_4$ | 6/1 | 91 | 44 | 70 | 29 | 15 | +4 | +4 | +12 | −1 | +6 |
| 3 | 2% $H_2SO_4$ | 6/1 | 86 | 26 | 60 | 14 | 8 | +6 | +1 | +3 | −4 | ±0 |
| 4 | 4% $H_2SO_4$ | 10/1 | 86 | 40 | 80 | 18 | 8 | +4 | +4 | +5 | +3 | +7 |
| 5 | Water | 6/1 | 88 | 11 | 30 | 4 | 1 | +5 | −3 | −5 | −2 | +1 |

Table 3

| | TEST CONDITIONS | | CALCULATED INDICATORS | | | | | | | | |
|---|---|---|---|---|---|---|---|---|---|---|---|
| | | | DISTRIBUTION COEFFICIENT | | | | | SEPARATION FACTOR | | | |
| # | WASH ACID | PHASE RATIO ORG/FRESH ACID | $P_2O_5$ | $Al_2O_3$ | $Fe_2O_3$ | MgO | CaO | $Al_2O_3$ | $Fe_2O_3$ | MgO | CaO |
| 1 | 2% $H_2SO_4$ | 10/1 | 0.018 | 0.207 | 0.055 | 1.042 | 1.500 | 11.49 | 3.04 | 57.88 | 83.33 |
| 2 | 4% $H_2SO_4$ | 6/1 | 0.016 | 0.185 | 0.057 | 0.426 | 0.647 | 11.50 | 3.52 | 26.43 | 40.19 |
| 3 | 2% $H_2SO_4$ | 6/1 | 0.022 | 0.444 | 0.105 | 1.412 | 2.00 | 20.20 | 4.79 | 64.18 | 90.90 |
| 4 | 4% $H_2SO_4$ | 10/1 | 0.015 | 0.125 | 0.022 | 0.371 | 0.571 | 8.62 | 1.48 | 25.59 | 39.41 |
| 5 | Water | 6/1 | 0.019 | 1.846 | 0.467 | 13.50 | 13.00 | 95.15 | 24.05 | 695.9 | 670.1 |

EXAMPLE 2

A continuous process for the solvent extraction of unpurified phosphoric acid containing impurities such as calcium, magnesium, iron (II and III) and aluminum with an organic extractant phase containing 19% by weight dinonylnaphalenesulfonic acid, 10% by weight isodecanol and 71% by weight mineral spirits was conducted as follows: The system consisted of three extraction cells, one dilute phosphoric acid stripping cell and two sulfuric acid stripping cells.

Referring to FIG. 2, organic extractant phase was pumped into cell 31 of the solvent extraction system at the rate of about 540 gpm (gallons per minute). Unpurified aqueous phosphoric acid phase was pumped into cell 35 at the rate of about 84 gpm, flowing counter-current to the organic extractant phase. The aqueous phosphoric acid phase contained about 32% $P_2O_5$ by weight. Product phosphoric acid exited cell 31 at about 79 gpm containing 24.7% $P_2O_5$ by weight.

The organic extractant phase containing the ionic metallic impurities and coextracted $P_2O_5$ enters the wash phase stripping all at about 540 gpm. Water, 9-12 gpm, is mixed with about 70 gpm of recycled loaded wash phase to give a total aqueous flow of about 80-82 gpm into the wash phase stripping cell 37. The total $P_2O_5$ concentration of the wash phase entering the wash phase stripping cell is about 150 grams/liter. Approximately 8-9 gpm of the loaded wash phase leaving the wash phase stripping cell is mixed with the crude aqueous phosphoric acid feed entering the extraction section at 38.

The organic extractant phase which exits the wash phase stripping cell contains extracted ionic metallic impurities and residual $P_2O_5$ values. It is pumped at the rate of about 540 gpm into the sulfuric acid stripping cell 39. Mineral acid stripping phase consisting of sulfuric acid, about 10% $H_2SO_4$ by weight, is passed into the mineral acid stripping phase section cell 41 at about 87 gpm, counter-current to the organic extractant phase. The waste mineral acid stripping phase exits the strip section at about 86-87 gpm, the organic extractant phase exits the strip section at about 540 gpm.

When the concentration of the sulfuric acid in the mineral acid stripping phase is increased to 15%-25% $H_2SO_4$ by weight, the volume of fresh sulfuric acid stripping phase entering the system is maintained at about 87 gpm. Waste mineral acid stripping phase containing 15% to 20% by weight of sulfuric acid is recycled.

The data shown below is an end-of-run equilibrium chemical analysis. Samples of both the organic phase and the aqueous phase of the wash phase stripping cell were collected and analyzed in a similar manner as described for the laboratory example.

The data in Table 4 shows that 60% of the $P_2O_5$ is removed from the organic extractant phase, lesser amounts of the ionic metallic impurities being removed. The S.F.'s indicate that phosphoric acid is selectively removed from the organic extractant phase.

Table 4

Pilot Plant
Continuous Solvent Extraction

| | g/l | | | | |
|---|---|---|---|---|---|
| | $P_2O_5$ | CaO | MgO | $Al_2O_3$ | $Fe_2O_3$ |
| Organic Extractant Phase (o) | 4.47 | 0.906 | 0.846 | 0.317 | 0.156 |
| Organic Extractant Phase Stripped With Phosphoric Acid (o) | 1.78 | 0.870 | 0.829 | 0.265 | 0.139 |
| Dilute Phosphoric Acid Stripping Phase (a) | 164 | 0.899 | 0.787 | 3.37 | 2.36 |
| %Removed by | 60 | 4 | 2 | 16 | 11 |
| $K(\frac{o}{a})$ | 0.0108 | 0.968 | 1.05 | 0.079 | 0.059 |
| S.F. | — | 89.6 | 97.2 | 7.3 | 5.4 |

What is claimed is:

1. A process for purifying an aqueous phosphoric acid phase which comprises the steps of:
   a. contacting an unpurified aqueous phosphoric acid phase containing from 5% to about 55% $P_2O_5$ by weight and at least ionic metallic impurities comprising dissolved calcium, magnesium, iron (II) and (III) and aluminum compounds with an organic extractant phase containing a water immiscible organic sulfonic acid in its $H^+$ form in the volumetric ratio of organic extractant phase to aqueous phosphoric acid phase of about 1 to 1 to about 100 to 1 at a temperature of about 20° C to about 65° C to form:
      i. an organic extractant phase containing the organic sulfonic acid, at least a portion of said ionic metallic impurities and extracted $P_2O_5$ values, and
      ii. a purified aqueous phosphoric acid phase;
   b. separating the purified aqueous phosphoric acid phase from the organic extractant phase;
   c. contacting the organic extractant phase from (b) with a wash phase in the volumetric ratio of organic extractant phase to wash phase of from about 1 to 1 to about 100 to 1 at a temperature of from about 20° C to about 65° C, said wash phase consisting essentially of water or dilute phosphoric acid containing from about 10 grams/liter of $P_2O_5$, wherein said wash phase preferentially separates $P_2O_5$ from the ionic metallic impurities in said extractant phase, to form
      i. a loaded wash phase enriched with the $P_2O_5$ values extracted from the organic extractant phase, and
      ii. an organic phase containing the organic sulfonic acid, extracted metallic impurities and residual $P_2O_5$ values; and
   d. separating the loaded wash phase from the organic extractant phase of step (c).

2. The process of purifying phosphoric acid as recited in claim 1 which comprises:
   contacting the organic extractant phase of step c(iii) containing the organic sulfonic acid, extracted ionic metallic impurities and residual $P_2O_5$ values with a mineral acid stripping phase, said mineral acid being an inorganic acid having an ionization constant of at least $10^{-3}$, the volumetric ratios of the organic extractant phase to the mineral acid stripping phase being from about 1 to 1 to about 20 to 1 to a temperature of from about 20° C to about 65° C to form:
      i. An organic extractant phase containing the organic sulfonic acid in its $H^+$ form, and
      ii. mineral acid stripping phase consisting of a solution of the mineral acid, the residual $P_2O_5$ values and the mineral acid salts of the ionic metallic impurities; and
   separating the organic extractant phase from the mineral acid stripping phase.

3. The process of purifying phosphoric acid solutions as recited in claim 2 in which the volumetric ratios of the organic extractant phase to the mineral acid stripping phase are from about 2 to 1 to about 10 to 1.

4. The process of purifying phosphoric acid solutions as recited in claim 2 in which the mineral acid stripping phase contains sulfuric acid, hydrochloric acid or nitric acid.

5. The process of purifying phosphoric acid solutions as recited in claim 2 in which the mineral acid stripping phase contains from about 2% to about 30% $H_2SO_4$ by weight.

6. The process of purifying phosphoric acid solutions as recited in claim 2 in which the organic sulfonic acid is selected from the group consisting of alkylaryl sulfonic acid, polyalkyaryl sulfonic acids, alkanoyl- arylsulfonic acids, polyalkanoylaryl- sulfonic acid and aromatic ring substituted derivatives thereof of formulas I and II:

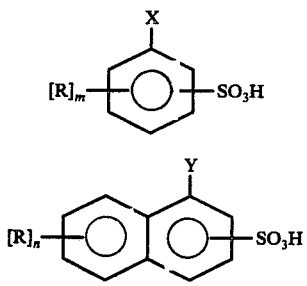

wherein in formula I, R is an alkyl group of from 5 to 25 carbon atoms or an alkanoyl group of 8 to 18 carbons, $[R]_m$ contains at least 8 carbon atoms when $m$ is 1 and $[R]_m$ contains at least 10 carbon atoms when $m$ is 2 and further provided that $m$ can be 1 or 2 when R is alkyl and $m$ can be 1 when R is alkanoyl; wherein in Formula II, R is an alkyl group of from 5 to 25 carbon atoms or an alkanoyl group of from 5 to 18 carbon atoms, $[R]_n$ contains at least 8 carbon atoms when $n$ is 1, $[R]_n$ contains at least 10 carbon atoms when $n$ is 2 and $[R]_n$ contains at least 15 carbon atoms when $n$ is 3, further provided that $n$ can be 1, 2, 3, when R is alkyl and $n$ can be 1 or 2 when R is alkanoyl; X is hydrogen, hydroxy, fluoro, chloro, bromo, iodo, methoxy, ethoxy, propoxy, -carboxymethoxy or -carboxyethoxy; and Y is hydrogen, fluoro, chloro, bromo, iodo, methoxy, ethoxy, 2-propoxy, -carboxymethoxy or -carboxyethoxy; provided, however, that Y is in the alpha position with respect to the —SO₃H group and further provided that the —SO₃H group is at position 1 or 2 on the naphthalene molecule.

7. The method of purifying phosphoric acid solutions as recited in claim 2 in which the organic sulfonic acid is selected from the group consisting of dinonylnaphthalene-sulfonic acid, 5-dodecanoyl-2-chlorobenzenesulfonic acid, 5-nonyl-2-ethoxybenzenesulfonic acid, 3,5-di-t-octyl-2-(alphacarboxymethoxy)-benzenesulfonic acid and 3,5-di-t-octyl-2-hydroxybenzenesulfonic acid.

8. The process of purifying phosphoric acid solutions as recited in claim 1 in which the organic extractant phase is contacted with the aqueous phosphoric acid phase at a volumetric ratio of about 2 to 1 to about 10 to 1.

9. The process of purifying phosphoric acid solutions as recited in claim 1 in which the volumetric ratios of the organic extractant phase to the wash phase is from 2 to 1 to about 10 to 1.

10. The process of purifying phosphoric acid as recited in claim 1 in which the water immiscible organic sulfonic acid is dissolved in a water immiscible organic solvent to form the organic extractant phase.

11. The process of purifying phosphoric acid solutions as recited in claim 10 in which the solvent for the water immiscible organic sulfonic acid is a water immiscible, saturated hydrocarbon having a boiling point between 120° C and 230° C, a flash point between 15° C and 70° C, and a density below the density of the phosphoric acid solution.

12. The process of purifying phosphoric acid as recited in claim 11 in which the solvent for the water immiscible organic sulfonic acid is a water immiscible organic compound selected from the group consisting of kerosene, mineral spirits, benzene, naphtha, xylene, toluene, nitrobenzene, carbontetrachloride, chloroform, methylene chloride, trichloroethylene, isooctane and heptane.

13. The process of purifying phosphoric acid as recited in claim 10 in which the concentration of the water immiscible organic sulfonic acid in the water immiscible organic solvent is from 0.05 molar to 3.0 molar.

14. The process of purifying phosphoric acid as recited in claim 10 in which the concentration of the water immiscible organic sulfonic acid in the water immiscible organic solvent is from 0.2 molar to 0.5 molar.

15. The process of purifying phosphoric acid solutions as recited in claim 10 in which the solvent for the water immiscible organic sulfonic acid is a mixture of water immiscible, saturated hydrocarbons having a boiling point between 120° C and 230° C, a flash point between 15° C and 70° C and a density below the density of the phosphoric acid solution.

16. The method of purifying phosphoric acid as recited in claim 1 in which the organic extractant phase additionally contains a water immiscible monohydric alcohol.

17. The method of purifying phosphoric acid as recited in claim 16 in which the water immiscible monohydric alcohol is an aliphatic alcohol selected from the group consisting of straight chain and branched chain aliphatic alcohols, present at a concentration of 5% to about 20% by weight of the organic extractant phase.

18. The method of purifying phosphoric acid solutions as recited in claim 17 in which the aliphatic alcohol is isodecanol used at a concentration of from about 7% to about 12% by weight of the organic extractant phase.

19. The process of claim 1 wherein said wash phase consists essentially of water.

* * * * *